US007235805B2

(12) United States Patent
Mukai

(10) Patent No.: US 7,235,805 B2
(45) Date of Patent: Jun. 26, 2007

(54) PAPER SHEETS THEFT PREVENTION INK DETECTOR AND PAPER SHEETS THEFT PREVENTION INK DETECTION METHOD

(75) Inventor: Masanori Mukai, Tokyo (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 11/207,905

(22) Filed: Aug. 22, 2005

(65) Prior Publication Data

US 2005/0285325 A1 Dec. 29, 2005

Related U.S. Application Data

(60) Division of application No. 11/017,969, filed on Dec. 22, 2004, which is a continuation of application No. PCT/JP02/08816, filed on Aug. 30, 2002.

(51) Int. Cl.
*G06K 9/74* (2006.01)

(52) U.S. Cl. ............................ 250/559.11; 250/559.45; 250/556; 235/379

(58) Field of Classification Search ................ 250/556, 250/559, 559.11, 559.45; 382/7, 33, 36; 235/449, 493, 379; 356/71; 283/85, 91
See application file for complete search history.

(56) References Cited

U.S. PATENT DOCUMENTS 3,782,543 A 1/1974 Martelli
4,139,219 A * 2/1979 Herndon ...................... 283/57
4,386,432 A * 5/1983 Nakamura .................. 382/135
5,434,427 A 7/1995 Crane
5,947,255 A * 9/1999 Shimada ..................... 194/207
6,908,029 B2 6/2005 Numata et al.
2005/0053183 A1 * 3/2005 Abe ............................ 377/94

FOREIGN PATENT DOCUMENTS

| | | |
|---|---|---|
| JP | 53-94995 | 8/1978 |
| JP | 59-188795 | 10/1984 |
| KR | 2002-73417 | 9/2002 |

OTHER PUBLICATIONS

U.S. Appl. No. 11/017,969, filed Dec. 22, 2004, Masanori Mukai, Fujitsu Frontech Limited.
U.S. Appl. No. 11/207,706, filed Aug. 22, 2005, Masanori Mukai, Fujitsu Frontech Limited.

(Continued)

*Primary Examiner*—Thanh X. Luu
*Assistant Examiner*—Tony Ko
(74) *Attorney, Agent, or Firm*—Staas & Halsey LLP

(57) ABSTRACT

A paper sheets feature detector 20, through which a banknote 21 is carried and passed is provided with a carrying-in sensor part 22, a transmissive and reflective line light sensor 23, a magnetic sensor 24, a thickness sensor 27, and a carrying-out sensor part 28. When a watermark part of the banknote 21 is measured by the line light sensor 23, a watermark pattern is detected by a light transmissive sensor, and that pattern is not detected by a light reflective sensor, the banknote 21 is determined to be a true banknote. Watermark braille is similarly processed. When the thread is detected by the light transmissive sensor and the thread is not detected by the light reflective sensor, the banknote 21 is determined to be a true banknote.

3 Claims, 10 Drawing Sheets

OTHER PUBLICATIONS

U.S. Appl. No. 11/207,829, filed Aug. 22, 2005, Masanori Mukai, Fujitsu Frontech Limited.

Office Action for corresponding Korean Application No. 10-2005-7000230 dated Apr. 26, 2006.

* cited by examiner

PAPER SHEETS THEFT PREVENTION INK DETECTOR AND PAPER SHEETS THEFT PREVENTION INK DETECTION METHOD

CROSS REFERENCE TO RELATED APPLICATION

This application is a divisional of application Ser. No. 11/017,969 filed Dec. 22, 2004, now pending, which is a continuation of international PCT application No. PCT/JP02/08816 filed Aug. 30, 2002, and both of which are incorporated by reference herein.

BACKGROUND OF THE INVENTION

1. Field of the Invention

The present invention relates to a paper sheets feature detector and a paper sheets feature detection method for correctly detecting presence of a watermark, a braille watermark, or a thread, which are important features showing that paper sheets are true paper sheets.

2. Description of the Related Art

Conventionally, there has been a paper sheets processor for automatically judging authenticity of paper sheets such as a banknote inserted from outside, and automatically sorting the paper sheets based on a result of the authenticity judgment.

In determining authenticity of the paper sheets by judgment in the conventional paper sheets processor as above, the authenticity of the paper sheets is generally determined by measuring features inherent in true paper sheets such as a watermark, braille, and a thread by a sensor. However, there has been a problem that it is difficult to know the differences between forged features and true features by the sensor.

For example, regarding a forged watermark pattern and a forged thread drawn by a pencil or the like corresponding to a true watermark pattern and a true thread, and the true watermark pattern and the true thread, the same measurement result is output for both the cases by a light transmissive sensor. Therefore, there is a problem that it is not possible to discriminate true paper sheets from forged paper sheets.

In view of the foregoing conventional actual conditions, it is an object of the invention to provide a paper sheets feature detector and a paper sheets feature detection method for correctly identifying features inherent in true paper sheets.

SUMMARY OF THE INVENTION

First, a paper sheets feature detector of the invention comprises at least: a light transmissive sensor part for measuring a watermark part of a paper sheet; a light reflective sensor part for measuring the watermark part; and a determination unit for determining that the paper sheet is a true paper sheet only when a result of measurement by the light transmissive sensor part shows existence of a watermark pattern and a result of measurement by the light reflective sensor part shows existence of a blank part.

Further, another example of a paper sheets feature detector of the invention comprises at least: a light transmissive sensor part for measuring a braille watermark part of a paper sheet; a light reflective sensor part for measuring the braille watermark part; and a determination unit for determining that the paper sheet is a true paper sheet only when a result of measurement by the light transmissive sensor part shows existence of a watermark braille and a result of measurement by the light reflective sensor part shows existence of a blank part.

Further, still another example of a paper sheets feature detector of the invention comprises at least: a light transmissive sensor part for measuring a thread part of a paper sheet; a light reflective sensor part for measuring the thread part; and a determination unit for determining that the paper sheet is a true paper sheet only when a result of measurement by the light transmissive sensor part shows existence of a thread and a result of measurement by the light reflective sensor part does not show existence of the thread.

Further, still another example of a paper sheets feature detector of the invention comprises at least: a light transmissive sensor part for measuring a thread part of a paper sheet; a thickness sensor part for measuring the thread part; and a determination unit for determining that the paper sheet is a true paper sheet only when a result of measurement by the light transmissive sensor part shows existence of a thread and a result of measurement by the thickness sensor part shows existence of the thread.

Further, still another example of a paper sheets feature detector of the invention comprises at least: a light transmissive sensor part for measuring a thread part of a paper sheet; a magnetic sensor part for measuring the thread part; and a determination unit for determining that the paper sheet is a true paper sheet only when a result of measurement by the light transmissive sensor part shows existence of a thread and a result of measurement by the magnetic sensor part shows existence of the thread.

Further, still another example of a paper sheets feature detector of the invention comprises at least: a light reflective sensor part for measuring a peripheral part of a paper sheet; and a determination unit for determining that when a result of measurement by the reflective sensor shows that ink is adhered to the whole peripheral part of the paper sheet, the ink is theft prevention ink.

Next, a paper sheets feature detection method of the invention comprises the steps of: measuring a watermark part of a paper sheet by a light transmissive sensor; measuring the watermark part by a light reflective sensor; and determining that the paper sheet is a true paper sheet only when a result of measurement by the light transmissive sensor shows existence of a watermark pattern and a result of measurement by the light reflective sensor shows existence of a blank part.

Further, another example of a paper sheets feature detection method of the invention comprises the steps of: measuring a braille watermark part of a paper sheet by a light transmissive sensor; measuring the braille watermark part by a light reflective sensor; and determining that the paper sheet is a true paper sheet only when a result of measurement by the light transmissive sensor shows existence of a watermark braille and a result of measurement by the reflective sensor shows existence of a blank part.

Further, still another example of a paper sheets feature detection method of the invention comprises the steps of: measuring a thread part of a paper sheet by a light transmissive sensor; measuring the thread part by a light reflective sensor; and determining that the paper sheet is a true paper sheet only when a result of measurement by the light transmissive sensor shows existence of a thread and a result of measurement by the light reflective sensor does not show existence of the thread.

Further, still another example of a paper sheets feature detection method of the invention comprises the steps of: measuring a thread part of a paper sheet by a light transmissive sensor; measuring the thread part by a thickness sensor; and determining that the paper sheet is a true paper sheet only when a result of measurement by the light transmissive sensor shows existence of a thread and a result of measurement by the thickness sensor part shows existence of the thread.

Further, still another example of a paper sheets feature detection method of the invention comprises the steps of: measuring a thread part of a paper sheet by a light transmissive sensor; measuring the thread part by a magnetic sensor; and determining that the paper sheet is a true paper sheet only when a result of measurement by the light transmissive sensor shows existence of a thread and a result of measurement by the magnetic sensor shows existence of the thread.

Further, still another example of a paper sheets feature detection method of the invention comprises the steps of: measuring a peripheral part of a paper sheet by a light reflective sensor; and determining that when a result of measurement by the reflective sensor part shows that ink is adhered to the whole peripheral part of the paper sheet, the ink is theft prevention ink.

As described above, according to the invention, it is possible to surely discriminate and reject forged paper sheets which have been often overlooked by a conventional single sensor, by measuring the paper sheets by combining two types of sensors. Further, it is possible to easily distinguish theft prevention ink from an existing ink stain, and reject the paper sheet to which the theft prevention ink is adhered.

DESCRIPTION OF THE PREFERRED EMBODIMENTS

Descriptions will be hereinafter given of an embodiment of the invention with reference to the drawings.

Figure 1:
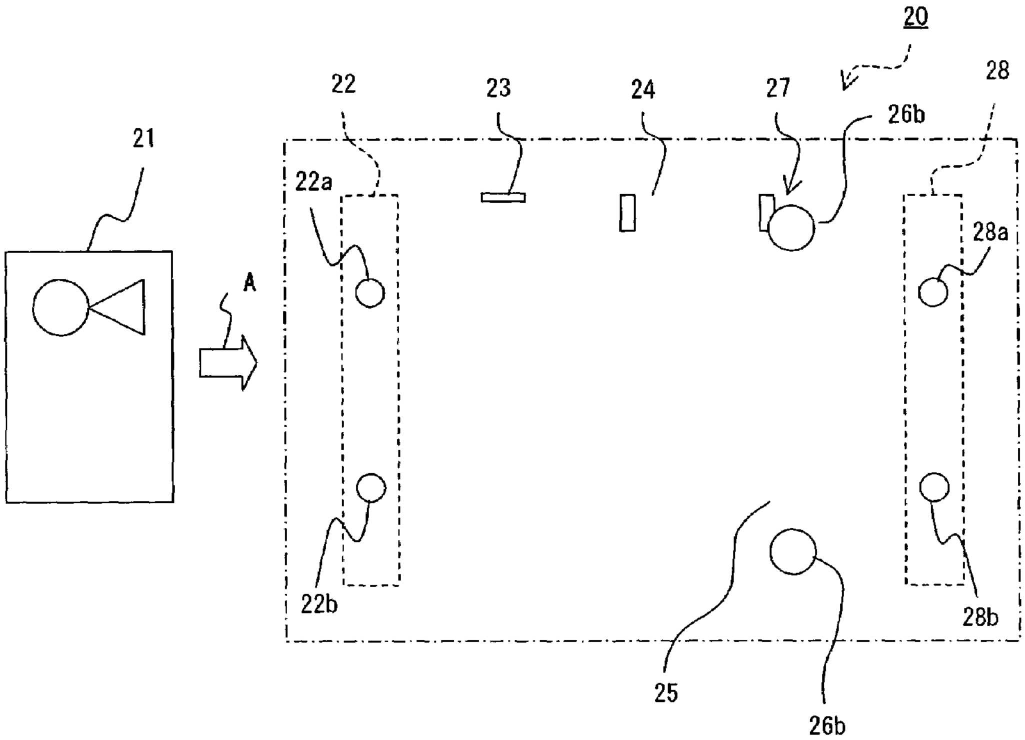
FIG. 1 is a view showing a model of a construction of a paper sheets feature detector in an embodiment.

FIG. 1 is a view showing a model of a construction of a paper sheets feature detector in the embodiment. Though not particularly shown in the figure, a paper sheets feature detector 20 shown in FIG. 1 is provided in the vicinity of a banknote slot on a carrying route from the banknote slot to a banknote accommodation part of a paper sheets processor such as an automated-teller machine. The paper sheets feature detector 20 is arranged as a device through which a banknote 21 which is inserted through the banknote slot and carried in the carrying direction indicated by arrow A to the banknote accommodation part firstly passes.

This paper sheets feature detector 20 is provided with the following components in the order of the carrying direction of the banknote 21 indicated by the arrow A: a carrying-in sensor part 22 constructed from at least two light sensors 22*a* and 22*b* arranged at a given interval; a line light sensor 23 arranged ahead of this carrying-in sensor part 22 in the carrying direction, which is constructed from a transmissive light sensor and a reflective light sensor; a magnetic sensor 24 arranged ahead of this line light sensor part 23 in the carrying direction; a thickness sensor 27 arranged ahead of this magnetic sensor 24 in the carrying direction, which is constructed from a thickness roller 25 and two angle sensors 26*a* and 26*b* arranged at both ends of the thickness roller 25; and a carrying-out sensor part 28 arranged ahead of the thickness sensor 27 in the carrying direction, that is, arranged in a foremost end of the paper sheets feature detector 20 in the carrying direction, which is constructed from at least two light sensors 28*a* and 28*b* arranged in a given interval.

The foregoing light sensors 22*a* and 22*b* of the carrying-in sensor part 22 are constructed from a light reflective or light transmissive single light sensor. The light sensors 22*a* and 22*b* detect a front end part in the carrying direction of the banknote 21, which is carried into the paper sheets feature detector 20. A banknote detection signal of this carrying-in sensor 22 is used as a signal showing timing of starting measurement of the banknote 21 being carried into the paper sheets feature detector 20.

Further, the light sensors 28*a* and 28*b* of the carrying-out sensor part 28 are also constructed from a light reflective or light transmissive single light sensor. The light sensors 28*a* and 28*b* detect a back end part in the carrying direction of the banknote 21 carried out from the paper sheets feature detector 20. A banknote detection signal of this carrying-out sensor part 28 is used as a signal showing timing of finishing measurement of the banknote 21.

The carrying-in sensor part 22 and the carrying-out sensor part 28 are not limited to the light sensor. For example, the carrying-in sensor part 22 and the carrying-out sensor part 28 can be constructed from a sensor constructed from, for example, a combination of a rotational pin and a switching circuit, which mechanically detects passage of paper sheets.

Figure 2:
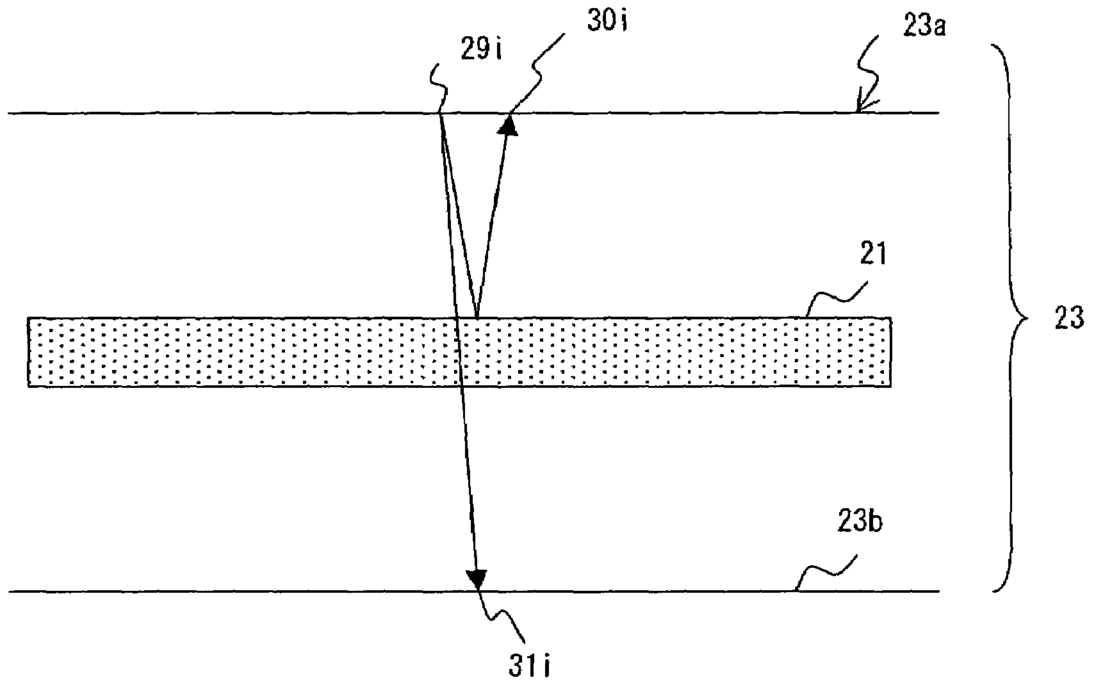
FIG. 2 is a view showing a model of a construction of a line light sensor arranged in the paper sheets feature detector in the embodiment.

FIG. 2 is a view showing a model of a construction of the line light sensor 23 arranged in the foregoing paper sheets feature detector 20. FIG. 2 is a cross section of a region wherein the line light sensor 23 is arranged, when the paper sheets feature detector 20 of FIG. 1 is viewed in the direction of the arrow A.

As shown in FIG. 2, the line light sensor 23 is constructed from a light reflective line light sensor (hereinafter referred to as light reflective sensor) 23*a* arranged on the upper paper sheets feature detector 20, which is formed by a light emitting device array forming n pcs of light emitting parts 29*i* (i=1, 2, 3, . . . and n) and a light acceptance device array forming n pcs of reflection side light acceptance parts 30*i* (i=1, 2, 3, . . . and n); and a light transmissive line light sensor (hereinafter referred to as light transmissive sensor) 23*b* arranged on the lower paper sheets feature detector 20, which is formed by a light acceptance device array forming n pcs of transmission side light acceptance parts 31*i* (i=1, 2, 3, . . . and n) operating in sync with light emitting of the foregoing n pcs of light emitting parts 29*i*.

A line length of this line light sensor 23 corresponds to the maximum width in the direction perpendicular to the direction carrying the paper sheets passing the paper sheets feature detector 20.

Due to the construction of this line light sensor 23, a measurement part segmentalized into minute regions of the banknote 21, which is measured by this line light sensor 23 is detected whether such a measurement part is a light transmissive part or a light non-transmissive part. Further, when the measurement part is the light non-transmissive part, luminance by a reflected light from that light non-transmissive part is detected. Meanwhile, when the measurement part is the light transmissive part, a watermark pattern or the like in that light transmissive part is concurrently detected.

Further, though not specifically shown in the figure, the magnetic sensor 24 shown in FIG. 1 is a line-like magnetic sensor constructed by arranging minute magnetic heads or magnetoresistive devices in a state of a line array, which is generally used. Thereby, a magnetic element printed on a surface of the banknote 21 and a metal thread incorporated in the banknote 21 can be detected.

Further, in the thickness sensor 27, a displacement angle of the thickness roller 25 is detected by the angle sensors 26*a* and 26*b* placed at both ends thereof. Thereby, a thickness fluctuating amount of the banknote 21 due to various threads incorporated in the banknote 21 can be detected.

Figure 3:
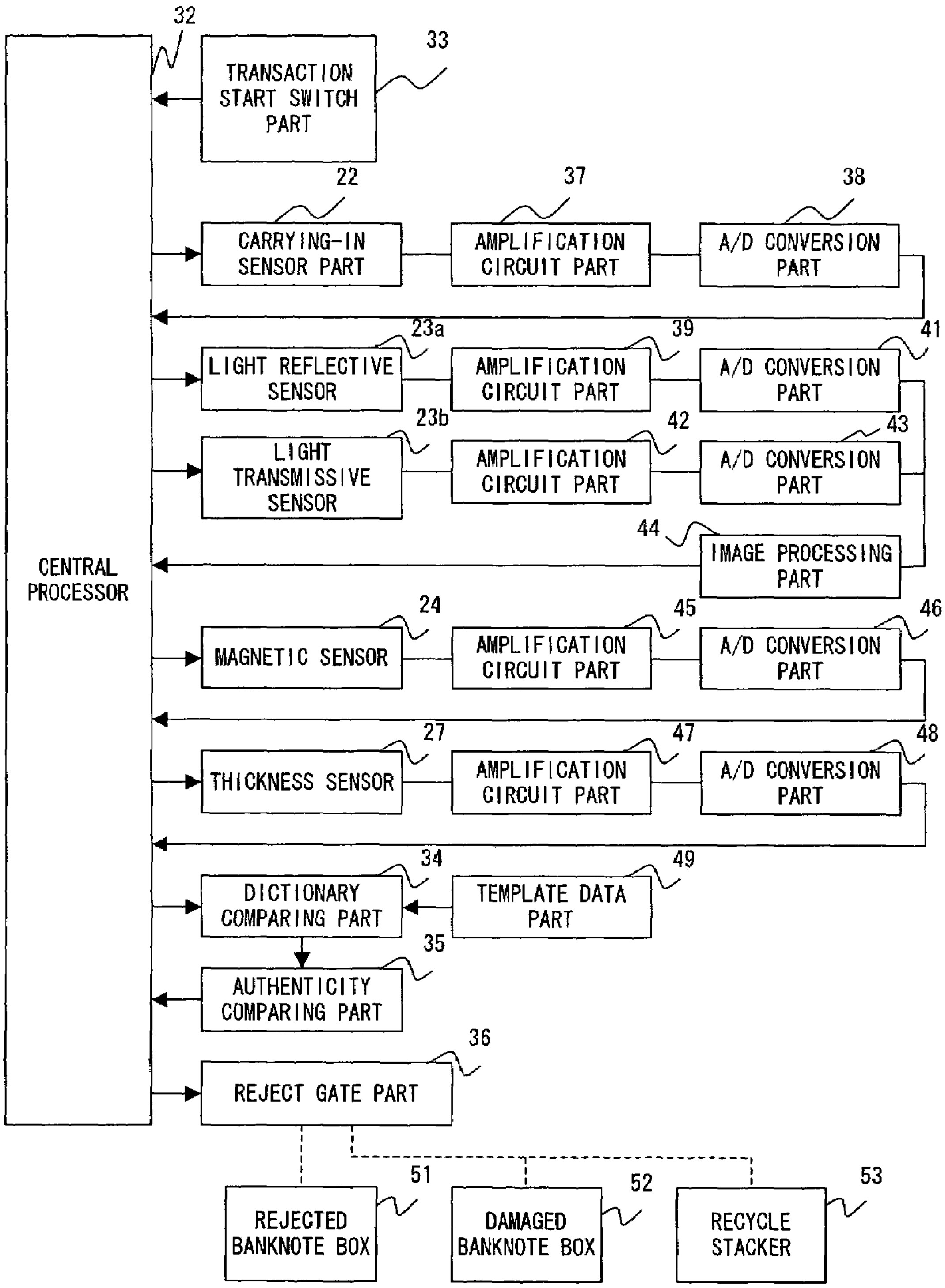
FIG. 3 is a block diagram showing the construction of a processing system centering on a central processor of the paper sheets feature detector in the embodiment.

FIG. 3 is a block diagram showing the construction of a processing system centering on a central processor of the foregoing paper sheets feature detector. In FIG. 3, for the same component parts as the component parts shown in FIGS. 1 and 2 are affixed with the same numbers as in FIGS. 1 and 2.

In the processing system shown in FIG. 3, a transaction start switch part 33 of an input operation panel arranged in a main body device of an automated-teller machine and the like is connected to a central processor 32. Further, the carrying-in sensor part 22, light reflective sensor 23*a*, light transmissive sensor 23*b*, magnetic sensor 24, and thickness sensor 27 shown in FIG. 1 or FIG. 2 are connected to the central processor 32. Furthermore, a template comparing part 34, an authenticity determination part 35, and a reject gate part 36 are connected to the central processor 32. Though not shown in the figure, the carrying-out sensor part 28 shown in FIG. 1 is also connected to the central processor 32.

In the foregoing construction, when the central processor 32 receives an input operation event directing transaction start from the transaction start switch part 33 of the foregoing input operation panel, the central processor 32 activates the carrying-in sensor part 22, light reflective sensor 23*a*, light transmissive sensor 23*b*, magnetic sensor 24, thickness sensor 27, and carrying-out sensor part 28, and performs sampling of banknote measurement data from the respective sensors for the required number of times.

An amplification circuit part 37 and an A/D conversion part 38 are connected to the foregoing carrying-in sensor part 22 in series. A banknote detection signal of the carrying-in sensor part 22 is input to the amplification circuit part 37, amplified by the amplification circuit part 37 at a given ratio, which is output to the A/D conversion part 38. The A/D conversion part 38 converts the input banknote detection analog signal to a digital signal. This converted banknote detection digital signal is output to the central processor 32.

An amplification circuit part 39 and an A/D conversion part 41 are connected to the light reflective sensor 23*a* in series. An amplification circuit part 42 and an A/D conversion part 43 are connected to the light transmissive sensor 23*b* in series. The light reflective sensor 23*a* and the light transmissive sensor 23*b* segment a whole area of the banknote 21 passing the paper sheets feature detector 20 into minute regions, measure the minute regions in the main scanning direction along the sensor line direction, and repeat the foregoing main scanning measurement in the carrying direction of the banknote 21, that is, in the sub-scanning direction in sync with carrying operation of the banknote 21.

Measurement data by the light reflective sensor 23*a* and the light transmissive sensor 23*b* is input to the amplification circuits 39 and 42, amplified by the amplification circuits 39 and 42 at a given ratio, which is output to the A/D conversion circuits 41 and 43. The A/D conversion circuits 41 and 43 convert the input measurement analog data of the banknote 21 to digital data, and output this converted measurement digital data on the banknote face to an image processing part 44.

The image processing part 44 provides image data of the banknote 21 shown by the digital data with various image processing such as skewing correction, concentration correction, and origin correction, and outputs this digital image data after image processing to the central processor 32.

An amplification circuit part 45 and an A/D conversion part 46 are connected to the magnetic sensor 24 in series. A magnetic detection analog signal by the magnetic sensor 24 is output to the A/D conversion part 46. The A/D conversion part 46 converts the input magnetic detection analog signal to a digital signal, and outputs the converted magnetic detection digital signal to the central processor 32.

An amplification circuit part 47 and an A/D conversion part 48 are connected to the thickness sensor 27 in series. The thickness sensor 27 detects a thickness of the banknote 21. Further, when the banknote 21 has a thread, the thickness sensor 27 detects a fluctuating amount of the thickness increased due to the thread. This thickness detection analog signal is output to the amplification circuit part 47. The amplification circuit part 47 amplifies the input thickness detection analog signal at a given ratio, which is output to the A/D conversion part 48. The A/D conversion part 48 converts the input amplified thickness detection analog signal to a digital signal, and outputs this converted thickness detection digital signal to the central processor 32.

As output information from the respective sensors, the foregoing digital image data, the magnetic detection digital signal, and the thickness detection digital signal are input from the central processor 32 to the template comparing part 34. A template data part 49 is connected to the template comparing part 34. In the template data part 49, databases of overall design information, watermark designs and position information thereof, braille and position information thereof, presence of a thread and materials and position information thereof and the like regarding various banknotes for each country are stored.

The template comparing part 34 compares the foregoing output information for each sensor, which is input from the central processor 32, to template information read from the template data part 49 correspondingly to the sensor output information, and outputs the comparison result to the authenticity determination part 35. The authenticity determination part 35 determines a denomination and authenticity of the banknote 21 based on the comparison result input from the template comparing part 34, and notifies the determination result to the central processor 32.

The central processor 32 controls the reject gate part 36 based on the determination result input from the authenticity determination part 35. Under this control, the reject gate part 36 switches carrying routes so that the banknote 21 is accommodated to a rejected banknote 51, a damaged banknote 52, or a recycle stacker 53.

Forged banknotes and stolen banknotes are accommodated in the upper rejected banknote 51. Banknotes required to be exchanged with true banknotes due to significant damage or stain are accommodated in the damaged banknote 52. Banknotes continuously usable are accommodated in the recycle stacker 53.

FIGS. 4 to 8 are flowcharts for explaining operations of processes to determine authenticity of banknotes, which are respectively performed under the control of the central processor 32 of the paper sheets feature detector 20 constructed as above. Any of these processes is a process from performing authenticity determination in the authenticity determination part 35 based on a combination of measurement data output from given two types of sensors, to notifying the determination result to the central processor 32.

Figure 4:
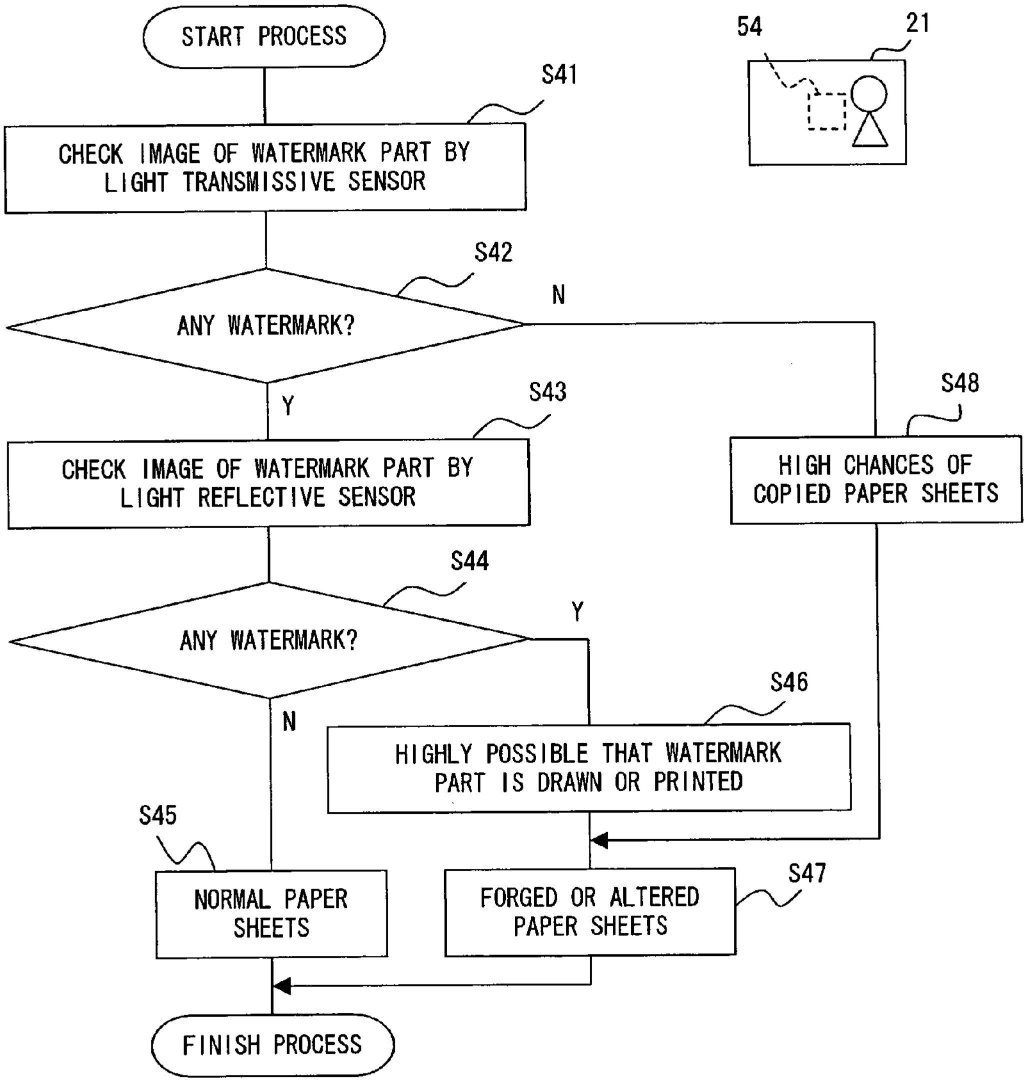
FIG. 4 is a flowchart for explaining an operation of a process to determine authenticity of a banknote by measuring a watermark part of the banknote in the embodiment.

FIG. 4 is a flowchart for explaining an operation of a process to determine authenticity of the banknote by measuring a part of a watermark 54 of the banknote 21 shown in the upper right portion. In FIG. 4, first, image data of the watermark 54 part among digital image data obtained by scanning by the light transmissive sensor 23*b* is checked (S41). In this process, denomination data is obtained from template data corresponding to whole image data of the banknote 21, and position data of the watermark 54 part is obtained from the denomination data.

A region of the banknote 21 shown by this position data is checked, and whether the watermark 54 exists or not, that is, whether a watermark picture is detected or not is determined (S42). When the watermark 54 exists, that is, the watermark picture is detected (determination result of S 42: Y), image data of the watermark 54 part among digital image data obtained by scanning by the light reflective sensor 23*a* is further checked (S43).

When a watermark does not exist, that is, a watermark picture is not detected from a surface of the banknote 21 (determination result of S44: N), it unit that a surface of the watermark 54 part of the banknote is blank, that is, the picture detected in S 42 is a true watermark picture. Therefore, the banknote 21 is determined to be a true banknote (S45), and the process is finished.

Meanwhile, in the determination of the foregoing process S44, when a watermark picture exists, (determination result of S44: Y), it is determined that it is highly possible that the watermark picture exists on the surface of the watermark 54 part which should be blank, that is, a picture similar to the watermark picture is drawn or printed on the watermark 54 part (S46). In this case, the banknote 21 is determined to be a forged banknote or an altered banknote (S47), and the process is finished.

Further, in the determination of the foregoing process S42, when the watermark 54 does not exist, (determination result of S41: N), it unit that a picture of the watermark 54 is not formed by a watermark. In this case, it is determined that it is highly possible that the banknote 21 is an imitated banknote which is copied by using a copying machine or the like (S48). In this case, S47 is also performed, and the process is finished.

As above, this example is devised by focusing attention on the a fact that a watermark part of a banknote or the like is watermarked inside the banknote by a special printing technique, and the watermark can be seen by people holding it up to the light, but cannot be seen through general reflected light. That is, this example utilizes a fact that the watermark image can be clearly seen by the light transmissive sensor, but never can be seen by the light transmissive sensor.

Thereby, in the case of a simply copied banknote, since a watermark image is not printed in the simply copied banknote, no output from the light transmissive sensor part is detected and the simply copied banknote is rejected. In the case that some image is drawn or printed on a watermark part, this forged banknote cannot be rejected by the light transmissive sensor, however, the forged banknote is rejected with a clue that the image which should not be detected essentially is seen by the light reflective sensor.

Figure 5:
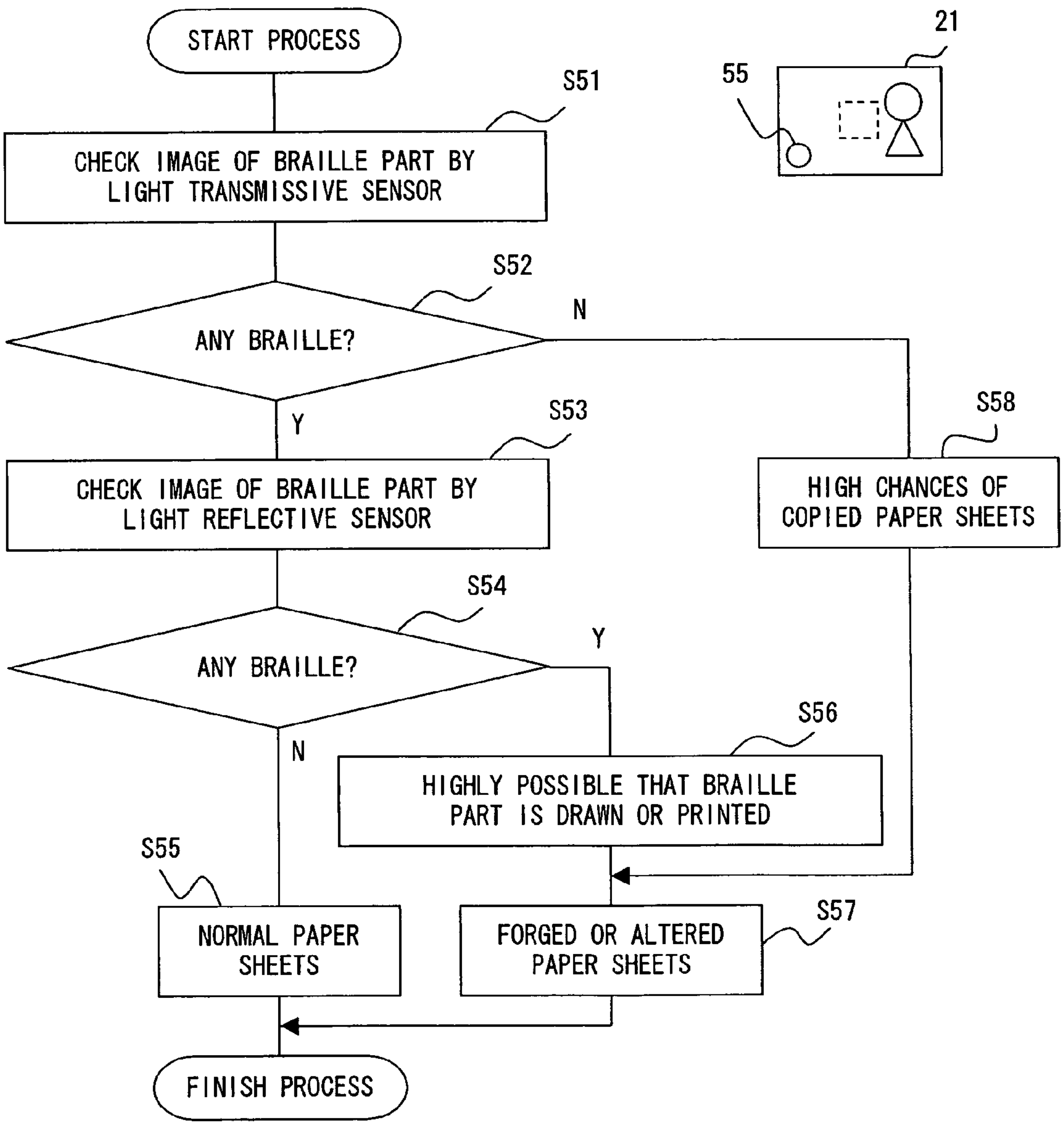
FIG. 5 is a flowchart for explaining an operation of a process to determine authenticity of a banknote by measuring a braille part of the banknote in the embodiment.

FIG. 5 is a flowchart for explaining an operation of a process to determine authenticity of a banknote by measuring a part of braille 55 of the banknote 21 shown in the upper right portion. As the braille 55 taken here, a case wherein the braille is formed by providing concavity and convexity with a watermark pattern in the lower left corner of the banknote 21 is taken for example. In such a braille 55, the concavity and convexity of the braille is detected as an image shaded or a region having a significant high transmitted light amount by the light transmissive sensor.

Therefore, also in this case, authenticity determination of the banknote 21 is performed the same way as in the authenticity determination by the watermark 54 shown in FIG. 4. That is, processes of S51 to S58 shown in FIG. 5 are the same processes as the processes of S41 to S48 shown in FIG. 4, except that the watermark 54 is replaced with the braille 55.

Figure 6:
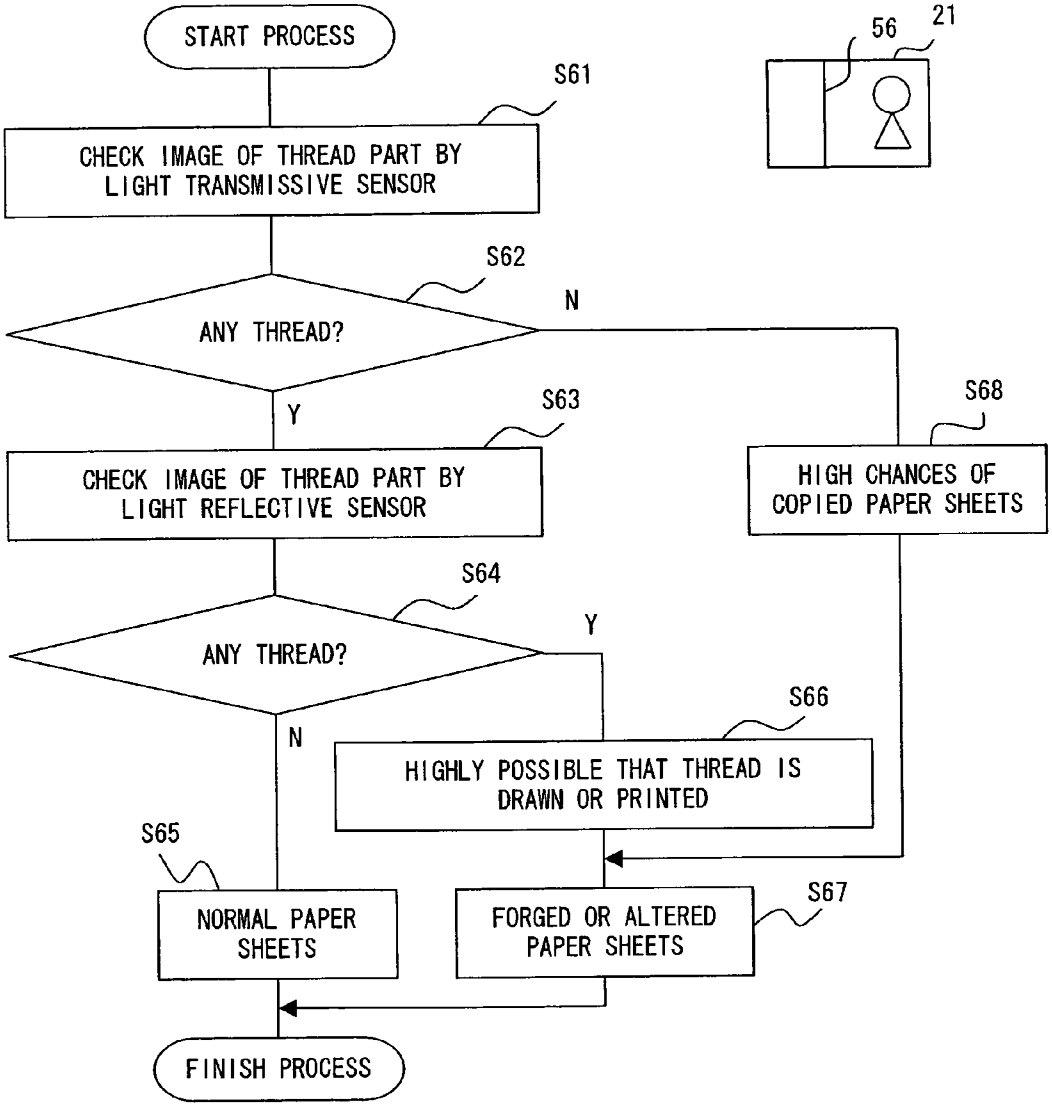
FIG. 6 is a flowchart for explaining an operation of a process to determine authenticity of a banknote by measuring a thread part, which is incorporated in the banknote and cannot be seen on a measurement face in the embodiment.

FIG. 6 is a flowchart for explaining an operation of a process to determine authenticity of a banknote by measuring a part of a thread 56, which is incorporated in the banknote 21 shown in the upper right portion, and not shown on a measurement face. This thread is a stripe made of a special fiber, plastic, or a metal, which is watermarked or woven inside the banknote or on one of back and front faces. This thread is often seen in overseas banknotes. Recently, such a thread has also been adopted in Japan to prevent a book coupon, a coupon ticket for bullet trains and the like from being forged.

In this example, forged banknotes are rejected by utilizing a fact that such a thread (incorporated inside) is seen by the light transmissive sensor but not seen by the light reflective sensor. In the case of the thread, which is not incorporated inside the banknote, but is woven on one of the back and front faces, the same result can be obtained if, firstly, its denomination and whether the thread is woven on the back face or the front face are determined from the database of the template data part 49 in the image recognition process in the template comparing part 34, and then measurement is made by using a face on which the thread is not woven as a measurement face.

In FIG. 6, first, image data of the thread 56 part among digital image data obtained by scanning by the light transmissive sensor 23*b* is checked (S61). In this process, denomination data is obtained from template data corresponding to whole image data of the banknote 21, and position data of the thread 56 part is obtained from the denomination data.

A region of the banknote 21 shown by this position data is checked, and whether the thread 56 exists or not, that is, whether a thread image is detected or not is determined (S62). When the thread 56 exists, that is, the image of the thread 56 is detected (determination result of S62: Y), image data of the thread 56 part of digital image data obtained by scanning by the light reflective sensor 23*a* is further checked (S63).

When a thread does not exist, that is, an image of the thread 56 is not detected from the measurement face of the banknote 21 (determination result of S64: N), it is determined that only a normal image is printed on the measurement face of the banknote, and the thread image detected in S62 is a true thread image, that is, the banknote 21 is a normal banknote (S65). The process is finished.

Meanwhile, when the image of the thread 56 exists in determination of the foregoing process S64 (determination result of S64: Y), it is determined that it is highly possible that an image of the thread 56 (stripe-like streak) exists on the measurement face on which images other than the regular image should not exist, that is, a stripe-like streak seen as an image similar to the true thread 56 is drawn or printed on the thread part (S66). In this case, the banknote 21 is determined to be a forged banknote or an altered banknote (S67), and the process is finished.

When the thread 56 does not exist in determination of the foregoing process S62 (determination result of S61: N), it is determined that it is highly possible that the banknote 21 is an imitated banknote copied by using a copying machine or the like (S68). In this case, S67 is also performed, and the process is finished.

Figure 7:
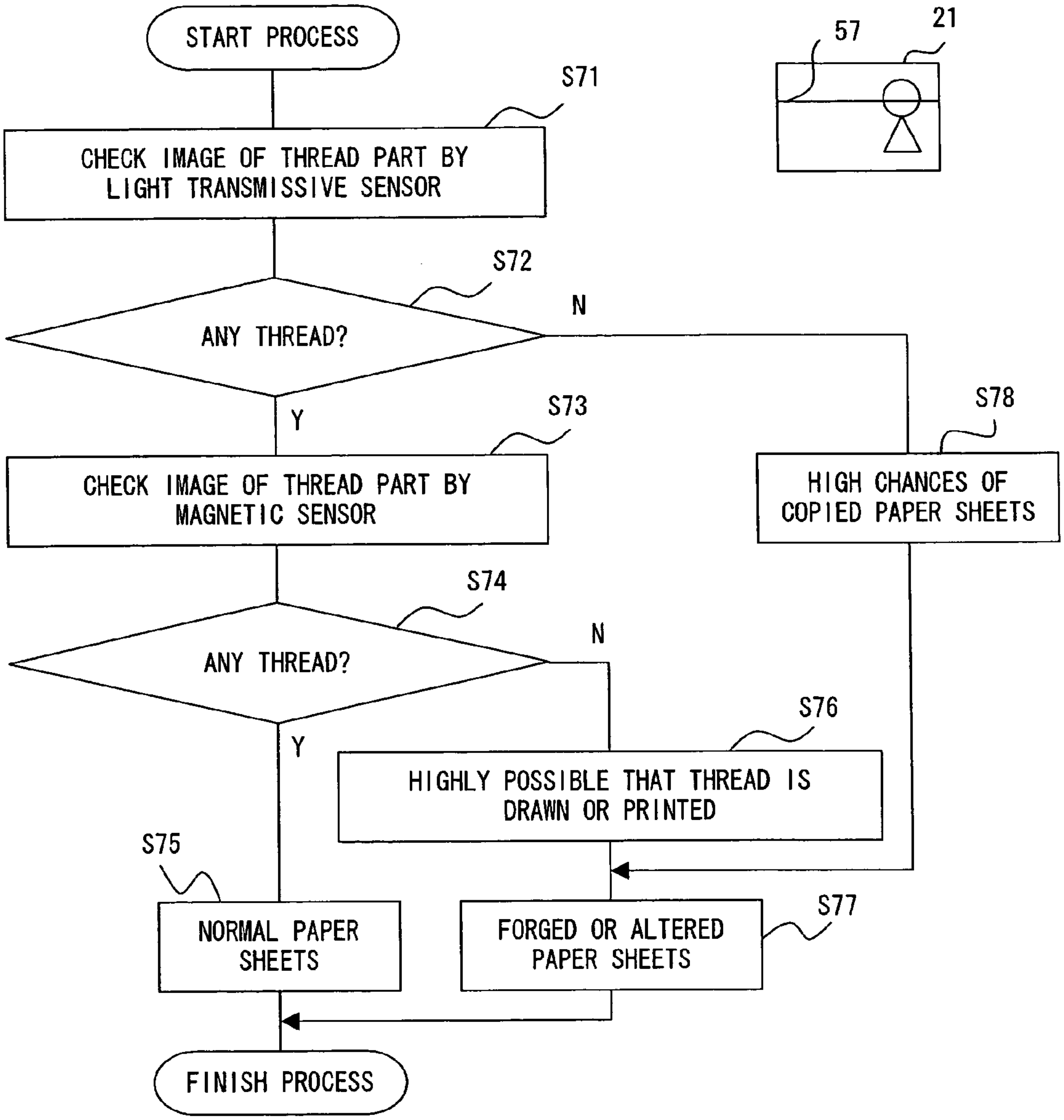
FIG. 7 is a flowchart for explaining an operation of a process to determine authenticity of a banknote by measuring a metal thread part, which is incorporated in the banknote and cannot be seen on a measurement face in the embodiment.

FIG. 7 is a flowchart for explaining an operation of a process to determine authenticity of a banknote by measuring a part of a metal thread 57, which is incorporated in the banknote 21 shown in the upper right portion, and not shown on a measurement face. This process is performed after a denomination is determined from the database of the template data part 49 in the image recognition process in the template comparing part 34, and the banknote 21 is recognized as a banknote in which the metal thread is incorporated by such a denomination determination.

In FIG. 7, first, image data of the metal thread 57 part among digital image data obtained by scanning by the light transmissive sensor 23*b* is checked (S71), and whether an image of the metal thread 57 is detected or not is determined (S72). When a metal thread-like image is detected in a position of the metal thread 57 (determination result of S72: Y), the data of the metal thread 57 part of a magnetic detection digital signal obtained by measurement by the magnetic sensor 24 is further checked (S73).

When a metal thread exists, that is, the magnetic detection digital signal is detected in the position wherein the metal thread 57 should exist (determination result of S74: Y), it is determined that the image of the metal thread detected in S72 is an image of the true metal thread 57, that is, the banknote 21 is a normal banknote (S75). The process is finished.

Meanwhile, when the magnetic detection digital signal is not detected in determination of the foregoing process S74 (determination result of S74: N), it is determined that it is highly possible that the image of the metal thread detected in S72 is a stripe-like streak seen as an image similar to the true metal thread 57, which is drawn or printed on the metal thread part (S76). In this case, the banknote is determined to be a forged banknote or an altered banknote (S77), and the process is finished.

When the metal thread 57 does not exist in determination of the foregoing process S72 (determination result of S71: N), it is determined that it is highly possible that the banknote is an imitated banknote copied by using a copying machine or the like (S78). In this case, S77 is also performed, and the process is finished.

As above, regarding the metal thread, a feature of a true banknote, the metal thread reactive to both the magnetic sensor and the light transmissive sensor is surely detected by combining the light transmissive sensor 23*b* and the magnetic sensor 24. When an imitated metal thread is drawn by hand or a metal thread is copied, the magnetic sensor shows no reaction. Therefore, forged banknotes can be surely rejected.

Figure 8:
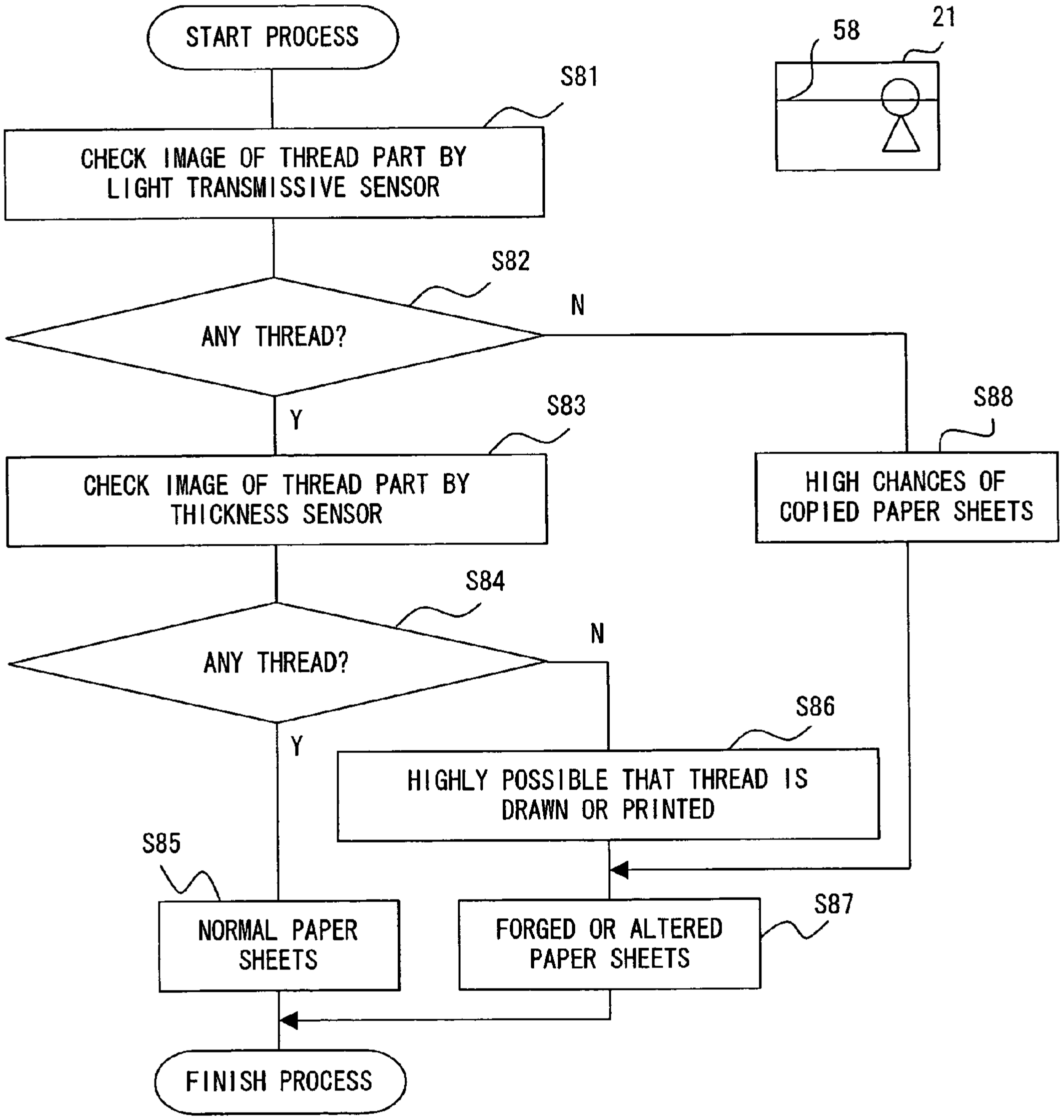
FIG. 8 is a flowchart for explaining an operation of a process to determine authenticity of a banknote by measuring a thick bar-like thread part, which is buried in the banknote and cannot be seen on a measurement face in the embodiment.

FIG. 8 is a flowchart for explaining an operation of a process to determine authenticity of a banknote by measuring a part of a thick bar-like thread 58, which is buried inside the banknote 21 shown in the upper right portion, and cannot be seen from outside. This process is also performed after a denomination is determined from the database of the template data part 49 in the image recognition process in the template comparing part 34, and the banknote 21 is recognized as a banknote in which the bar-like thread is buried by such a denomination determination.

In FIG. 8, first, image data of the bar-like thread 58 part among digital image data obtained by scanning by the light transmissive sensor 23*b* is checked (S81), and whether an image of the bar-like thread 58 is detected or not is determined (S82). When a bar-like and thread-like image is detected in a position of the bar-like thread 58 (determination result of S82: Y), data of the bar-like thread 58 part of a thickness detection digital signal obtained by measurement by the thickness sensor 27 is further checked (S83).

When a bar-like thread exists, that is, the thickness detection digital signal is detected in the position wherein the bar-like thread 58 should exist (determination result of S84: Y), it is determined that the image of the bar-like thread detected in S82 is an image of the true bar-like thread 58, that is, the banknote 21 is a normal banknote (S85). The process is finished.

Meanwhile, when the thickness detection digital signal is not detected in determination of the foregoing process S84 (determination result of S84: N), it is determined that it is highly possible that the image of the bar-like thread detected in S82 is a bar-like streak seen as an image similar to the true bar-like thread 58, which is drawn or printed on the bar-like thread part (S86). In this case, the banknote is determined to be a forged banknote or an altered banknote (S87), and the process is finished.

Further, when the bar-like thread 58 does not exist in determination of the foregoing process S82 (determination result of S81: N), it is determined that it is highly possible that the banknote is an imitated banknote copied by using a copying machine or the like (S88). In this case, S87 is also performed, and the process is finished.

As above, regarding the bar-like thread, a feature of a true banknote, the bar-like thread reactive to both the thickness sensor and the light transmissive sensor is surely detected by combining the light transmissive sensor 23*b* and the thickness sensor 27. When an imitated bar-like thread is drawn by hand or the bar-like thread is copied, the thickness sensor shows no reaction. Therefore, forged banknotes can be surely rejected.

Figure 9:
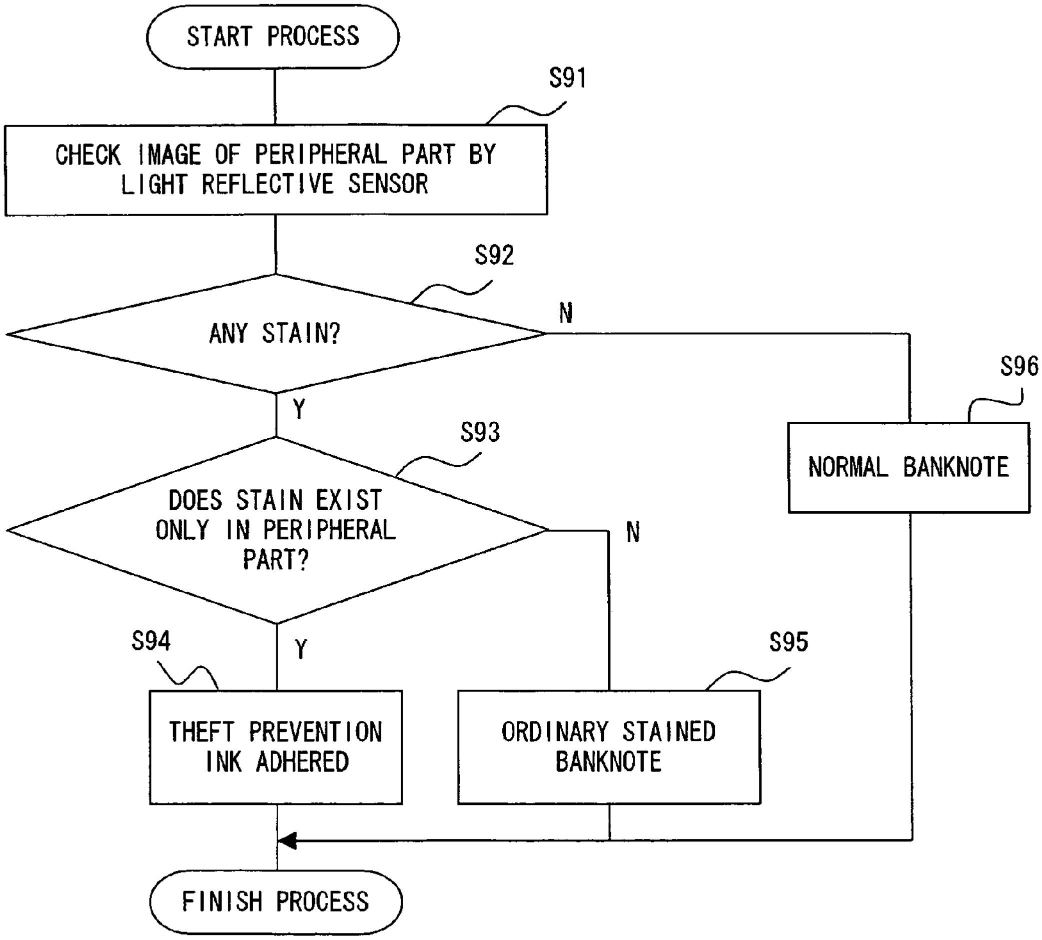
FIG. 9 is a flowchart for explaining a process to detect theft prevention ink adhered to a banknote by using only a light reflective sensor in the embodiment.

FIG. 9 is a flowchart for explaining a process to detect theft prevention ink adhered to a banknote by using only the light reflective sensor, slightly different from the processes described above.

The theft prevention ink is previously arranged in an inner cashbox of the paper sheets processor. When a door is opened by devious unit in order to steal cash from the inner cashbox of the paper sheets processor, the foregoing theft prevention ink is sprayed on the bundle of banknotes. This system is one of the security techniques generally used for mainly overseas paper sheets processors.

The paper sheets to which the theft prevention ink is adhered as above are stolen paper sheets, which are preferably not received by paper sheets processors. Meanwhile, when the theft prevention ink is not special ink, it is difficult to discriminate the banknote to which the theft prevention ink is adhered from an ordinary stained banknote, and therefore, there has been a problem that it is difficult to reject the banknote to which the theft prevention ink is adhered. In this example, even the theft prevention ink which is not made of special ink is discriminated as theft prevention ink.

In FIG. 9, first, image data in a peripheral part of the banknote 21 among digital data obtained by scanning by the light reflective sensor 23*a* is checked (S91), and whether stain exists or not is determined (S92). When stain is detected (determination result of S92: Y), whether the stain exists only in the peripheral part of the banknote 21 or not is determined (S93).

In this determination, when the stain exists only in the peripheral part of the banknote 21 (determination result of S93: Y), the stain is determined to be a stain with theft prevention ink (S94), and the process is finished. Meanwhile, when the stain exists not only in the peripheral part of the banknote 21 but also inside of the banknote 21 in determination of S93 (determination result of S93: N), the stain is determined to be an ordinary stain, that is, this banknote 21 is determined to be ordinary stained banknote (S95), and the process is finished.

Further, when stain does not exist in determination of the foregoing S92 (determination result of S92: Y), the banknote 21 is determined to be a normal banknote (S96), and the process is finished.

As described above, this example focuses attention on the fact that the theft prevention ink is sprayed and adhered to the banknotes accommodated in the cashbox. Ordinary circulating banknotes are rarely stained in the peripheral part only. Therefore, when ink is adhered to only the peripheral part, the banknote 21 is determined to be a banknote to which the theft prevention ink is adhered, and rejected.

Figure 10:
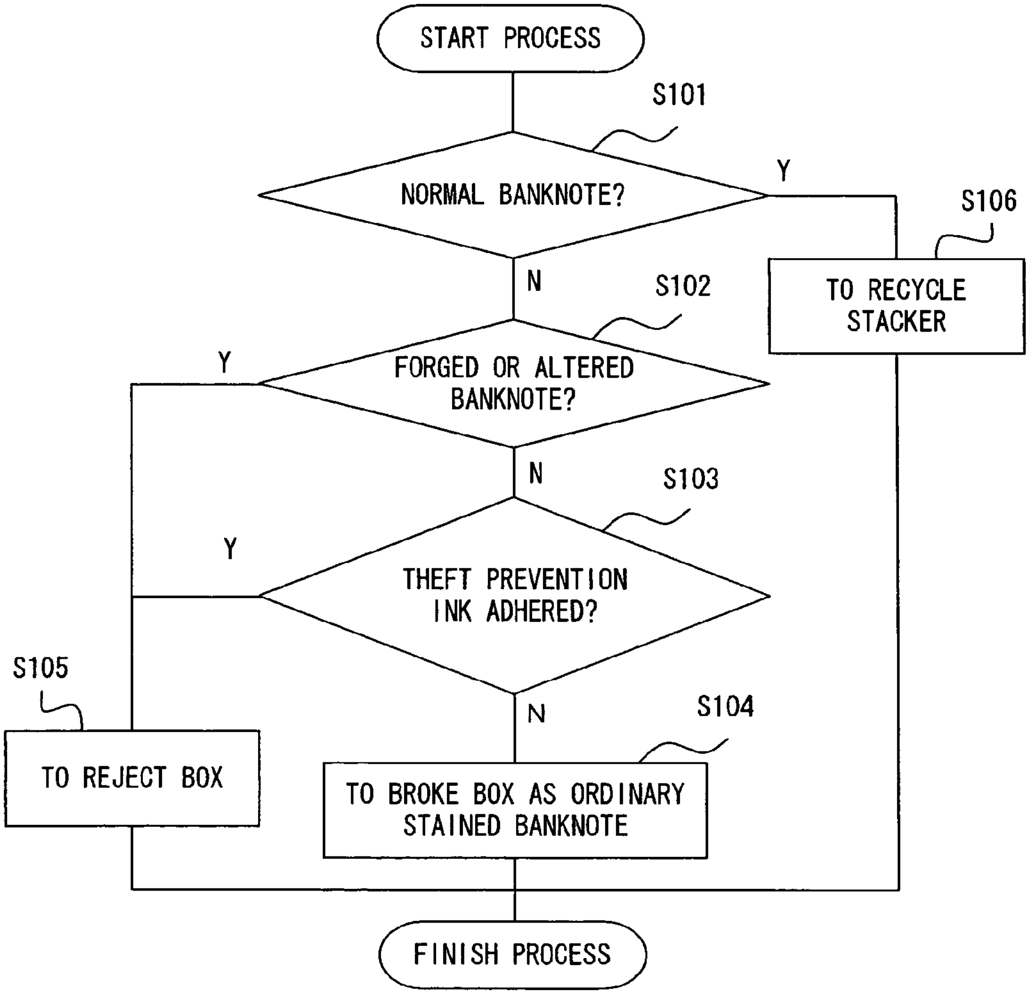
FIG. 10 is a flowchart of a separated accommodation process of a banknote, which is performed by a reject gate part after determination is made whether the banknote is a normal banknote, a forged or altered banknote, or a stolen banknote.

FIG. 10 is a flowchart of a separated accommodation process of a banknote by controlling the reject gate part 36 by the central processor 32, after that the banknote is determined as a normal banknote, a forged or altered banknote, or a stolen banknote at the authenticity determination part 35 in FIGS. 4 to 9 as described above.

In FIG. 10, first, whether the banknote 21 has been determined to be a normal banknote or not is determined (S101). When the banknote 21 has been determined to be a normal banknote (determination result of S101: Y), carrying routes are switched so that the banknote 21 is accommodated in the recycle stacker 53 (S106), and the process is finished.

Meanwhile, when the banknote 21 is not a normal banknote (determination result of S101: N), whether the banknote 21 has been determined to be a forged or altered banknote or not is subsequently determined (S102). When the banknote 21 has been determined to be a forged or altered banknote (determination result of S102: Y), carrying routes are switched so that the banknote 21 is accommodated in the rejected banknote 51 (S105), and the process is finished.

When the banknote 21 is not a forged or altered banknote in determination in S102 (determination result of S102: N), whether the banknote 21 has been determined to be a banknote to which theft prevention ink is adhered or not is determined (S103). When the banknote 21 has been determined to be a banknote to which the theft prevention ink is adhered (determination result of S103: Y), this banknote 21 is a stolen banknote. In this case, carrying routes are also switched so that the banknote 21 is accommodated in the rejected banknote 51 (S105), and the process is finished.

Further, when the banknote 21 is not a banknote to which the theft prevention ink is adhered in determination of the foregoing S103 (determination result of S103: N), the banknote 21 is an ordinary much stained banknote. In this case, carrying routes are switched so that the banknote 21 is accommodated in the damaged banknote 52 (S104), and the process is finished. As above, the banknote 21 is measured by the respective sensors, determined whether the banknote 21 is a normal banknote, a forged or altered banknote, or a stolen banknote by the authenticity determination part 35, and accommodated in a given accommodation vessel based on that determination.

In the foregoing embodiment, descriptions have been given while the banknote has been taken as an example for paper sheets. However, paper sheets are not limited to the banknote. The invention can be applied to various paper sheets such as a stock certificate, coupon for goods, boarding card, ticket, and admission card for playfield.

Further, in any example from FIG. 4 to FIG. 8, two types of sensors are combined. However, combination is not limited thereto, and it is possible to determine authenticity of paper sheets by combining three or more types of sensors.

As described above, according to a paper sheets feature detector and a paper sheets feature detection method of the invention, it is possible to surely discriminate and reject forged paper sheets which have been often overlooked by a conventional single sensor by measuring the paper sheets by combining two or more types of sensors, and it is also possible to easily separate theft prevention ink from existing ink stain and reject paper sheets to which the theft prevention ink is adhered. Therefore, in the past when many crimes of forged paper sheets occur, it is possible to provide a very effective automatic determination environment for determining authenticity of paper sheets used in a paper sheets processor by applying the invention to the paper sheets processor.

What is claimed is:

1. A paper sheets theft prevention ink detector comprising at least:

a light reflective line sensor for measuring a peripheral part of a paper sheet by scanning the paper sheet from front end part to back end part; and a determination unit for determining that when a result of measurement by the reflective line sensor shows that a stain is adhered only to a peripheral part of the paper sheet, the paper sheet was stolen.

2. A paper sheets theft prevention ink detection method wherein:

measuring a peripheral part of a paper sheet by a light reflective line sensor by scanning the paper sheet from front end part to back end part; and determining that when a result of measurement by the reflective line sensor shows that a stain is adhered only to a peripheral part of the paper sheet, the paper sheet was stolen.

3. A method of paper sheets theft prevention ink detection, comprising:

scanning a paper sheet from a front end part to a back end part;

measuring a peripheral part of the paper sheet by a light reflective line sensor; and determining that the paper sheet was stolen if a stain appears only in a peripheral part of the paper sheet.

* * * * *